US00RE36066E

United States Patent [19]

Mueller et al.

[11] E Patent Number: Re. 36,066

[45] Reissued Date of Patent: *Jan. 26, 1999

[54] USE OF SELECTED ESTER OILS IN DRILLING FLUIDS AND MUDS

[75] Inventors: Heinz Mueller, Dusseldorf; Claus-Peter Herold, Mettmann; Stephan von Tapavicza, Düsseldorf, all of Germany; Douglas J. Grimes, Stonehaven, Scotland; Jean-Marc Braun, Luxembourg, Luxembourg; Stuart P. T. Smith, Kincardineshire, Scotland

[73] Assignees: Henkel KGaA, Duesseldorf, Germany; Baroid Limited, London, England

[ * ] Notice: The portion of the term of this patent subsequent to Mar. 16, 2001, has been disclaimed.

[21] Appl. No.: 506,458

[22] Filed: Aug. 1, 1995

Related U.S. Patent Documents

Reissue of:

[64] Patent No.: 5,232,910
Issued: Aug. 3, 1993
Appl. No.: 759,097
Filed: Sep. 6, 1991

U.S. Applications:

[63] Continuation of Ser. No. 452,457, Dec. 18, 1989, abandoned.

[30] Foreign Application Priority Data

Dec. 19, 1988 [DE] Germany ..... 3842659

[51] Int. Cl.[6] ..... C09K 7/02

[52] U.S. Cl. ..... 507/138; 507/140

[58] Field of Search ..... 507/138, 140

[56] References Cited

U.S. PATENT DOCUMENTS

| | | | |
|---|---|---|---|
| 2,217,926 | 10/1940 | Pieter Van Campen . | |
| 2,689,219 | 9/1954 | Menaul . | |
| 2,698,833 | 1/1955 | Wilson . | |
| 2,816,073 | 12/1957 | Stratton . | |
| 2,862,881 | 12/1958 | Reddie . | |
| 2,999,063 | 9/1961 | Hoeppel . | |
| 3,507,792 | 4/1970 | Zuraw et al. . | |
| 3,728,277 | 4/1973 | Foley . | |
| 3,761,410 | 9/1973 | Mondshine et al. . | |
| 3,894,959 | 7/1975 | Gardiner et al. . | |
| 3,979,305 | 9/1976 | Fischer et al. | 507/103 |
| 4,212,794 | 7/1980 | Grodde et al. . | |
| 4,356,096 | 10/1982 | Cowan et al. . | |
| 4,362,635 | 12/1982 | Dhein | 508/222 |
| 4,374,737 | 2/1983 | Larson et al. . | |
| 4,409,108 | 10/1983 | Carney et al. . | |
| 4,436,636 | 3/1984 | Carnicom | 507/118 |
| 4,474,666 | 10/1984 | Olmedo et al. . | |
| 4,481,121 | 11/1984 | Barthel . | |
| 4,554,080 | 11/1985 | Headley . | |
| 4,572,790 | 2/1986 | Headley . | |
| 4,631,136 | 12/1986 | Jones, III . | |
| 4,695,411 | 9/1987 | Stern et al. . | |
| 4,802,998 | 2/1989 | Mueller et al. . | |
| 4,964,615 | 10/1990 | Mueller et al. . | |

FOREIGN PATENT DOCUMENTS

| | | |
|---|---|---|
| 0009746 | 4/1980 | European Pat. Off. . |
| 229912 | 11/1986 | European Pat. Off. . |
| 2560210 | 8/1985 | France . |
| 3419415 QA1 | 11/1985 | Germany . |
| 80940 | 11/1982 | Romania . |
| 2158437 | 5/1985 | United Kingdom . |
| PCT/US86/02598 | 6/1987 | WIPO . |

OTHER PUBLICATIONS

Oleochemicals, Unichema International Product Specifications, May 1988.

Article: Ester Base Stocks, *JSL*, Jul. 1984, pp. 153–169.

Drilling Fluids Optimization—A Practical Field Approach, Penwell Books, 1986 By: James L. Lummus, J.J. Azar.

Parrish et al., "Variability of the Acute Toxicity of Drilling Fluids to Mysids 'Mysidopsis Bahia'", EPA Report No. EPA/600/D–88/212, 1988.

P.A. Boyd et al., "New Base Oil Used in Low–Toxicity Muds", Journal of Petroleum Technology, 1985.

R. B. Bennett, "New Drilling Fluid Technology—Mineral Oil Mud", Journal of Petroleum Technology, 1984.

Translation of FR 2 560 210 (published 30 Aug. 1985); cited as reference AM in Information Disclosure Statement filed Aug. 1, 1995.

Translation of DE 34 19 415 (published Nov 28, 1985); cited as reference AO in Information Disclosure Statement filed Aug. 1, 1995.

Translation of Article: "Use of Vegetable Oils and Their Transesterification Products as Diesel Fuels", P. Gateau et al. *Rev. Inst. Fr. Pet.* vol. 40, No. 4, Jul./Aug. 1985, pp. 509–528, cited as reference BL in Information Disclosure Statement filed Aug. 1, 1995.

Excerpt from *Manual of Drilling Fluids Technology*, "Stuck Pipe", NL/Baroid/NL Industries, Inc., pp. 3, 12 & 13 (1985).

Analytic Tables, *Vegetable Oils, Fatty Acid Components*, Ashland Chemical Company, 2 pages, (1973).

*Composition and Constants of Natural Fats and Oils*, 1 page document (date unknown).

*Sources et monographies des principaux corps gras*, p. 315 (date after 1989—not a reference). (Date Unknown).

(List continued on next page.)

*Primary Examiner*—Philip Tucker
*Attorney, Agent, or Firm*—Connolly & Hutz

[57] ABSTRACT

Invert emulsion muds for drilling of gas and oil, which are environmentally safe, and which contain:

A. a continuous oil phase composed predominantly of at least one monocarboxylic acid ester of a $C_2$–$C_{12}$ monofunctional alkalol wherein the monocarboxylic acid contains from 16 to 24 carbon atoms and is olefinically mono- or poly-unsaturated, B. a disperse aqueous phase, C. at least one emulsifier, D. at least one weighing agent, E. at least one fluid loss additive, and F. a mild alkaline reserve.

42 Claims, No Drawings

OTHER PUBLICATIONS

L.G. Zachary et al., *Tall Oil and its Uses*, F.W. Dodge Co., a division of McGraw–Hill, pp. 14 and 26, (1965).
Kirk–Othmer, *Encyclopedia of Chemical Technology*, vol. 22, third edition, cover page and pp. 531–541 (1982).
*Ullmans Enzyklopädie der technischen* Chemie, 4., neubearbeitele und erweiterte Auflage, Band 11, Erdöl und Erdgas bis Formazanfarbstoffe, Verlag Chemie, Weinheim/Bergstr., cover page and p. 542 (date unknown).
*Acides Gras et Cires*, p. 405 (date unknown).
One page document, collection of tables in French (date unknown).
Manuel de Rhēologie des Fluides de Forage et Laitiers de Ciment Editions Technip 27, 1979.
Article: "Use of Vegetable Oils and Their Transesterification Products as Diesel Fuels", By: Gateau, J.C. Guibet, G. Hilton, R. Stern; *Rev. Pet.*, 1985 pp. 509–528.
Article: "Diesel Fuel Derived from Vegetable Oils II: Emission Tests Using Rape Oil Methyl Ester" *Energy in Agriculture* 4, (1985) pp. 207–215.
Article: "Ester Oils—Structure and Chemical–Physical Properties" By: M. Wildersohn, *Tribologie + Schmierungstechnik*, pp. 70–75 No Date Available.
Chapter: The Basics of Industrial Oleochemistry: A Comprehensive Survey of Selected Technologies Based on Natural Oils and Fats, pp. 90–101 No Date Available By G. Dieckelmann & H.J. Heinz.

Document: Presentation of alternative organic carrier fluids for drilling sludge, presented at the Forum on Borehole Stability, in Aberdeen, Sep. 15, 1988.

Document: Presented at an NIF Course on oil field chemicals held at Fagernes (Norway) in Mar. 1987.

Document: Sent by Henkel KGaA to the Operators, dated Jun. 1986.

List of oil chemicals, issued by Henkel KGaA in Jul. 1986.

Letter dated 31 Jul. 1987 from Henkel DGaA Dusseldorf to Anchor Drilling Fluids.

Ecological Evaluation of Carrier Fluid/Base Oil OMG 233 (Henkel) No Date Available.

Mineral Oil Free Oil–Based Drilling Fluids Developments and Outlook No Date Available.

Document: Presented at NIF Course on oil field chemicals held at Fagerness in Mar. 1987 [{3}] Author: Dr. Claus–Peter Herold.

Proposal sent by Henkel KGaA to the Operators, dated Jun. 1986 [{4}] Corporate Author: Henkel KGaA Dusseldorf.

Mineral Oil Free Oil–Based Drilling Fluids Development and Outlook [{6}] Authors: C.–P. Herold, H. Muller, Dr. von Tapavicza from Labs of Henkel KGaA Dusseldorf (No Date Available).

USE OF SELECTED ESTER OILS IN DRILLING FLUIDS AND MUDS

Matter enclosed in heavy brackets [ ] appears in the original patent but forms no part of this reissue specification; matter printed in italics indicates the additions made by reissue.

This application is a continuation of U.S. application Ser. No. 07/452,457 filed on Dec. 18, 1989 now abandoned.

BACKGROUND OF THE INVENTION

1. Field of the Invention

This invention relates to new drilling fluids based on ester oils and to invert drilling muds based thereon which combine high ecological compatibility with good stability and performance properties.

2. State of Related Art

It is known that liquid drilling fluids for sinking bores in rock and bringing up the rock cuttings are slightly thickened, water-based or oil-based fluid systems. Oil-based systems are being increasingly used in practice, particularly in offshore drilling or in the penetration of water-sensitive layers.

Oil-based drilling fluids are generally used in the form of so-called invert emulsion muds which consist of a three-phase system, namely: oil, water and finely divided additives, including in particular emulsifiers and emulsifier systems, weighting agents, fluid loss additives, alkali reserves, viscosity regulators and the like, for stabilizing the system as a whole and for establishing the desired performance properties. Full particulars can be found, for example, in the Article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology—Mineral Oil Mud" in Journal of Petroleum Technology, 1984, 975 to 981 and the literature cited therein.

Oil-based drilling fluids were originally made from diesel oil fractions containing aromatic constituents. For the purposes of detoxification and reducing the ecological problems thus created, it was then proposed to use hydrocarbon fractions substantially free from aromatic compounds—now also known as "nonpolluting oils"—as the continuous oil phase, cf. the literature cited above. Although certain advances were achieved in this way through elimination of the aromatic compounds, a further reduction in the environmental problems caused by drilling fluids of the above type seems to be urgently required. This applies in particular to the sinking of offshore wells for the development of oil and gas sources because the marine ecosystem is particularly sensitive to the introduction of toxic and non-readily degradable substances.

The relevant technology has for some time recognized the significance of ester-based oil pleases for solving these problems. Thus, U.S. Pat. Nos. 4,374,737 and 4,481,121 describe oil-based drilling fluids in which nonpolluting oils are said to be used. Non-aromatic mineral oil fractions and vegetable oils of the peanut oil, soybean oil, linseed oil, corn oil and rice oil type, and even oils of animal origin, such as whale oil, are mentioned alongside one another as nonpolluting oils of equivalent rank. The ester oils of vegetable and animal origin mentioned here are all triglycerides of natural fatty acids which are known to be environmentally safe and which, ecologically, are distinctly superior to hydrocarbon fractions, even where they have been de-aromaticized.

Interestingly, however, not one of the Examples in the US patents cited above mentions the use of such natural ester oils in invert emulsion drilling muds. Mineral oil fractions are used throughout as the continuous oil phase.

In its general descriptive part, U.S. Pat. No. 4,491,121 mentions not only triglycerides, but also a commercial product "Arizona 208" of the Arizona Chemical Company, Wayne, N.J., which is a purified isooctyl-monoalcohol ester of high-purity tall oil fatty acids. An ester of a monofunctional alcohol and monofunctional carboxylic acids, mentioned for the first time here, is described as equivalent to triglycerides of natural origin and/or de-aromaticized hydrocarbon fractions.

The cited US patent does not contain any reproducible Examples relating to the use of such an ester of monofunctional components.

DESCRIPTION OF THE INVENTION

Other than in the operating examples, or where otherwise indicated, all numbers expressing quantities of ingredients or reaction conditions used herein are to be understood as modified in all instances by the term "about".

The investigations on which the present invention is based have shown that the use of readily degradable oils of vegetable and/or animal origin, which was considered in the prior art, is not feasible for practical reasons. The rheologic properties of such oil phases cannot be controlled for the wide temperature range required in practice of 0° to 5° C. on the one hand up to 250° C. and higher on the other hand.

The teaching of the present invention is based on the observation that it is in fact possible to produce oil-based invert drilling fluids based on ester oils of high environmental compatibility which correspond in their storage and in-use behavior to the best of the hitherto known oil-based drilling fluids, but have the additional advantage of increased environmental compatibility. Two key observations in this regard dominate the teaching according to the invention:

The triglycerides accumulating in the form of natural oils are not suitable for the production of mineral-oil-free oil-based invert drilling fluids, whereas the esters of monofunctional carboxylic acids with monofunctional alcohols derived from those oils or fats are suitable for the production of such drilling fluids. The second key observation is that ester oils of the present type do not in fact show the same in-use behavior as the mineral oil fractions used hitherto based purely on hydrocarbons. In practical application, the ester oils of monofunctional components of the invention undergo partial hydrolysis, resulting in the formation of free fatty acids. These free fatty acids react in turn with the alkaline constituents always present in invert drilling fluids, for example with the alkali reserve used to prevent corrosion, to form the corresponding salts. However, salts of highly hydrophilic bases and the acids in the range of from about $C_{16}$ to $C_{24}$ commonly encountered in fats and oils of natural origin are known to be compounds having comparatively high HLB values which lead in particular to the formation and stabilization of o/w emulsions. Use is made of this to a very considerable extent in the field of detergents and cleaning preparations. However, the formation of undesirably large quantities of such o/w emulsifier systems must interfere with the w/o emulsions required for solving the problem addressed by the invention and, hence, leads to problems. The teaching of the present invention as described in the following shows how invert drilling fluids based on ester oils can be effectively used in practice despite these difficulties inherent in the system.

In a first embodiment, therefore, the present invention relates to the use of selected esters—flowable and pumpable at temperatures in the range of from 0° to 5° C.—of monofunctional $C_{2-12}$ alcohols (alkanols) and olefinically mono- and/or polyunsaturated C16–24 monocarboxylic acids or mixtures thereof with small quantities of other, more especially saturated monocarboxylic acids as the oil phase, or at least a substantial part of the oil phase, of invert drilling muds which contain in a continuous oil phase a disperse aqueous phase and also emulsifiers, weighting agents, fluid loss additives and, if desired, other standard additives together with an alkali (alkaline) reserve, with the proviso that strong hydrophilic bases, such as alkali metal hydroxides and/or diethanolamine, are not used in significant quantities. Lime (calcium hydroxide) is often added as the alkali reserve, more especially for protection against inrushes of $CO_2$ and/or $H_2S$ into the drilling fluid and hence for protection against corrosion. An addition of lime such as this may be used as the alkali reserve in accordance with the invention. However, it is important to ensure that only comparatively small quantities of this alkaline component are incorporated. In a preferred embodiment of the invention, the maximum addition of lime is of the order of 2 lb/bbl (lime/oil mud) and is thus distinctly below the quantities typically used in practice in oil-based invert drilling fluids.

In another embodiment, the invention relates to mineral-oil-free invert drilling fluids which are suitable for the offshore development of oil and gas sources and, in a continuous oil phase based on ester oils, contain a disperse aqueous phase together with emulsifiers, weighting agents, fluid loss additives and, if desired, other standard additives. The new drilling fluids are characterized in that the oil phase consists at least substantially of esters of monofunctional $C_{2-12}$ alcohols and olefinically mono and/or polyunsaturated $C_{16-24}$ monocarboxylic acids and in that the w/o emulsion is mildly alkalized and, where lime is added, this alkali reserve preferably does not exceed quantities of about 2 lb/bbl (lime/oil mud). The lime content is preferably slightly below this limit.

The ester oils selected in accordance with the invention which are intended to form the entire continuous oil phase of the invert drilling muds or at least a substantial part thereof (i.e. over 50% by weight thereof) are discussed first in the following.

As already stated, an important criterion lies in the choice of esters which may be assigned to the class of reaction products of monofunctional carboxylic acids with monofunctional alcohols. In addition, however, it is intended in accordance with the invention exclusively or at least predominantly to use $C_{16}$–$C_{24}$ carboxylic acids within this class. The carboxylic acids may be derived from unbranched or branched hydrocarbon chains, preferably linear chains. Monocarboxylic acids of this type and of the $C_{16}$ to $C_{24}$ range and esters thereof are unsuitable as predominantly saturated hydrocarbon compounds due to their comparatively high solidification points. Even then, however, esters of this type are flowable and pumpable down to temperatures of 0° to 5° C. providing an adequate level of olefinically unsaturated ester constituents is guaranteed. In the preferred embodiment of the invention, therefore, esters of the described type of which more than 70% by weight and preferably more than 80% by weight are derived from olefinically unsaturated $C_{16-24}$ carboxylic acids are used. Important natural starting materials are carboxylic acid mixtures which contain at least 90% by weight olefinically unsaturated carboxylic acids in the above C range. The unsaturated carboxylic acids may be mono- and/or polyolefinically unsaturated. Where carboxylic acids or carboxylic acid mixtures of natural origin are used, the double ethylenic double bond in particular and, to a lesser extent, even a triple ethylenic double bond per carboxylic acid molecule plays a role in addition to a single ethylenic double bond in the molecule. Particulars of this are given in the following.

In conjunction with the choice of esters of monofunctional reactants in accordance with the invention, the choice of such a comparatively highly unsaturated carboxylic acid component in the ester oils ensures that the ester oils and, ultimately, the final invert emulsions show the rheologic properties required in practice, particularly at relatively low temperatures. The comparatively highly unsaturated ester oils containing 16 to 24 C atoms in the monocarboxylic acid component, which are used in accordance with the invention, have solidification points (pour point and setting point) below −10° C. and more especially below −15° C. in the preferred embodiment. Despite this high mobility at low temperatures, the molecular size of the ester oil prescribed in accordance with the invention ensures that the flashpoints of the ester oils are sufficiently high, being at least 80° C., and generally exceeding a temperature limit of approximately 100° C. Ester oils having flashpoints above 160° C. are preferred. Ester oils of the described type showing high mobility, even at low temperatures, and having flashpoints of 185° C. or higher can be produced without difficulty.

In conjunction with these high flashpoints determined by the size of the molecule, it is possible at the same time to ensure that the viscosity values are within the required limits. Thus, preferred ester oils of the described type show a Brookfield (RVT) viscosity at a temperature of 0° to 5° C. of not more than 55 mPa.s and preferably of at most 45 mPa.s or lower. It is possible to adjust values of 30 or even higher, for example in the range of from 20 to 25 mPa.s, at temperatures in the range indicated.

Among the unsaturated ester oils suitable for use in accordance with the invention, there are two sub-classes of particular importance.

The first of these sub-classes is based on unsaturated $C_{16-24}$ monocarboxylic acids of which no more than about 35% by weight are diolefinically and, optionally, polyolefinically unsaturated. In their case, therefore, the content of di-and polyunsaturated carboxylic acid residues in the ester oil is comparatively limited. Within this sub-class it is preferred that at least about 60% by weight of the carboxylic acid residues are monoolefinically unsaturated.

In contrast to the first sub-class described above, the second sub-class of ester oils of particular significance is derived from $C_{16-24}$ unsaturated monocarboxylic acid mixtures of which more than 45% by weight and preferably more than 55% by weight are derived from diolefinically and/or polyolefinically unsaturated acids within the above C range.

The most important monoethylenically unsaturated carboxylic acids within the above carbon range are hexadecenoic acids (palmitoleic acid ($C_{16}$)), oleic acid ($C_{18}$), the related ricinoleic acid ($C_{18}$) and erucic acid ($C_{22}$). The most important di-unsaturated carboxylic acid within the range in question here is linoleic acid ($C_{18}$) while the most important triethylenically unsaturated carboxylic acid is linolenic acid ($C_{18}$).

Selected individual esters formed from an unsaturated monocarboxylic acid and a monoalcohol can be used as the ester oil in accordance with the invention. One example of such esters are the esters of oleic acid, for example of the oleic acid isobutyl ester type. So far as the rheology of the system is concerned and/or for reasons of availability, it is frequently desirable to use esters from acid mixtures. This is of importance so far as meeting the above-stated specifications of the two-classes for preferred ester oils is concerned.

As already mentioned, the first of these two sub-classes is distinguished by the fact that its content of di-unsaturated and polyunsaturated acids is limited and does not exceed about 35% by weight. Vegetable oils of natural origin, of which the hydrolysis or transesterification gives mixtures of carboxylic acids or carboxylic acid esters of the type required here, are for example palm oil, peanut oil, castor oil and, in particular, rapeseed oil. Suitable rapeseed oils are both traditional types of high erucic acid content and also the more modern types of reduced erucic acid content and increased oleic acid content.

Ester oils of the first sub-class which correspond to this definition are particularly important for the simple reason that problems possibly arising from the lack of stability to oxidation are reduced. In practice, the drilling fluid is of course continuously pump-circulated and, in the process, is brought constantly into contact with atmospheric oxygen, often over a large area and at least slightly elevated temperatures, for the purpose of separating out the rock cuttings brought up, for example by sieving.

However, carboxylic acid mixtures of the second subclass mentioned above are also of considerable practical significance for use in accordance with the invention. This is attributable in part to their broad accessibility from natural fats of animal and/or vegetable origin. Classic examples of oils which have a high content of $C_{16-18}$ or $C_{16-22}$ carboxylic acids and which, at the same time, contain at least about 45% of at least diethylenically unsaturated carboxylic acids are cottonseed oil, soybean oil, sunflower oil and linseed oil. The tall oil acids isolated during the recovery of cellulose also fall within this range. However, starting materials of the last type are generally distinguished by more or less large additional contents of resin constituents. A typical animal starting material for the production of corresponding carboxylic acid mixtures is fish oil, particularly herring oil.

As already mentioned, the ester oils used in accordance with the invention can be certain selected individual esters corresponding to the above definition. However, mixtures of esters of corresponding monocarboxylic acids and monoalcohols will normally be present. In this regard, the scope of the invention encompasses above all those mixtures which, on the one hand, meet the viscosity requirement according to the invention and of which, on the other hand, at least 50% comprise the monofunctional esters of the olefinically mono- and/or polyunsaturated $C_{16-24}$ carboxylic acids. Ester constituents and, in particular, carboxylic acid esters or monofunctional alcohols and monofunctional carboxylic acids of different constitution may be present as minor constituents of the mixture providing the mixture has the required property profile. This is important where carboxylic acid mixtures of natural origin are used. Natural starting materials such as these generally also contain more or less large proportions of saturated carboxylic acids, often including linear $C_{16-18}$ carboxylic acids. Saturated fatty acids of this type and their esters readily give rise to rheologic difficulties due to their comparatively high melting points. According to the invention, therefore, saturated $C_{16-18}$ is carboxylic acids preferably make up no more than 20% by weight and, in particular, no more than 10% by weight of the ester oils.

By contrast, the presence of saturated carboxylic acids containing less than 16 carbon atoms and, more especially, from 12 to 14 carbon atoms is more acceptable. In small quantities, the contents of such lower, fully saturated fatty acids often present in natural starting materials are frequently valuable mixture components in the context of the problem addressed by the invention. Their esters are not vulnerable to oxidation under practical inuse conditions and their rheologic properties promote the objective of the invention, namely to replace the pure hydrocarbon oils hitherto solely used in practice by ester oils or ester oil fractions.

The alcohol radicals or the esters or ester mixtures according to the invention are preferably derived from straight-chain and/or branched-chain saturated alcohols, particular significance being attributed to alcohols containing at least 3 C atoms and, more especially, to alcohols containing up to about 10 C atoms. The alcohols can also be of natural origin, in which case they have normally been obtained from the corresponding carboxylic acids or their esters by hydrogenating reduction. However, the invention is by no means limited to starting materials of natural origin. Both on the monoalcohol side and on the monocarboxylic acid side, the starting materials of natural origin may be partly or completely replaced by corresponding components of synthetic origin. Typical examples of alcohols are the corresponding oxo alcohols (branched alcohols) and the linear alcohols obtained by the Ziegler process. Similarly, monocarboxylic acid components present in particular in carboxylic acid mixtures can be derived from petrochemical synthesis. However, the advantages of starting materials of natural origin lie in particular in their proven lower toxicologic values, their ready degradability and their ready accessibility. The natural destruction of the used oil mud ultimately required presupposes that ester oils of the type described herein be both aerobically and anaerobically degradable.

However, one important limitation is associated with the use of these ester oils in invert oil muds of the type used in the present invention. This limitation arises out of the difficulty mentioned at the beginning that, in principle, the carboxylic acid esters are vulnerable to hydrolysis and, accordingly, have to behave differently than the pure hydrocarbon oils hitherto used.

Invert drilling muds of the type used herein contain the finely disperse aqueous phase, normally together with the continuous oil phase, in quantities of from 5 to 45% by weight and preferably in quantities of from 5 to 25% by weight. Particularly preferred is the range of 10 to 25% by weight of disperse aqueous phase. This pre-condition from the constitution of conventional drilling muds also applies to the ester-based invert drilling muds of the invention. It is clear that, in continuous practical operation, disturbances of the equilibrium can occur in the multiphase system as a result of partial ester hydrolysis.

The situation is complicated by the fact that, in practice, drilling muds of the present type always contain an alkali reserve. This alkali reserve is particularly important in affording protection against corrosion caused by unexpected inrushes of acidic gases, particularly $CO_2$ and/or $H_2S$. The danger of corrosion to the drill pipe requires the safe establishment of pH values at least in the mildly alkaline range, for example in the range from pH 8.5 to 9 and higher.

In oil muds based on pure hydrocarbon fractions as the oil phase, strongly alkaline and, at the same time, highly hydrophilic inorganic or organic additives are generally used in practice without any difficulty. Particular significance can be attributed to the alkali hydroxides and, in particular, to sodium hydroxide on the one hand or to highly hydrophilic organic bases, diethanolamine and/or triethanolamine being particularly typical additives for binding impurities of $H_2S$. In addition to and/or instead of the highly hydrophilic inorganic and organic bases mentioned here, lime or even more weakly basic metal oxides, especially zinc oxide or comparable zinc compounds, are particularly important as the alkali reserve. Lime in particular is widely used an inexpensive alkalizing agent. It may safely be used in comparatively high quantities of, for example, from 5 to 10 lb/bbl (lime/oil mud) or even higher.

The use of the ester-based oil muds of the invention requires a departure from standard practice so far as these variables are concerned. It is of course necessary in this case, too, to ensure that the pH value of the drilling mud is kept at least in the mildly alkaline range and that a sufficient quantity of alkali reserve is available for unexpected inrushes of, in particular, acidic gases. At the same time, however, the ester hydrolysis should not be undesirably promoted and/or accelerated by such an alkali content.

Thus, in the preferred embodiment of the invention, no significant quantities of highly hydrophilic, inorganic and/or organic bases are used in the oil mud. In particular, the invention does not use alkali hydroxides or highly hydrophilic amines of the diethanolamine and/or triethanolamine type. Lime may be effectively used as the alkali reserve. In that case, however, it is best to limit the maximum quantity of lime used in the drilling mud to around 2 lb/bbl or slightly lower, for example to between 1 and 1.8 lb/bbl (lime/drilling mud). In addition to or instead of lime, it is also possible to use other known alkali reserves, including in particular the less basic metal oxides of the zinc oxide type and other comparable zinc compounds. However, even where acid-binding agents such as these are used, it is important not to use excessive amounts to prevent unwanted premature ageing of the drilling mud accompanied by an increase in viscosity and hence a deterioration in the rheologic properties. The particular aspect of the teaching according to the invention prevents or at least limits the formation of unwanted quantities of highly active o/w emulsifiers to such an extent that the favorable rheologic properties are maintained for long periods in operation, even in the event of thermal ageing. In relation to the recommendations of the prior art which have hitherto remained in the realm of theoretical considerations, this represents a significant surplus which actually enables the low toxic properties of ester oils of the present type to be utilized in practice for the first time.

The esters based on olefinically unsaturated $C_{16-24}$ monocarboxylic acids defined in accordance with the invention, which flow and can be pumped at temperatures in the range from 0° to 5° C., generally make up at least about half the continuous oil phase of the drilling mud. However, preferred oil phases are those in which esters or ester mixtures of the type according to the invention are very much predominantly present. In one particularly important embodiment of the invention, the oil phase consists almost entirely of such ester oils. Components suitable for mixing with the ester oils defined in accordance with the invention are, in particular, selected other ester oil fractions which are described in U.S. Ser. No. 07/452,988 now abandoned "Drilling Fluids and Muds Containing Selected Ester Oils"), filed of even data herewith. The invention also encompasses mixtures with such other selected ester oils. These ester oils, which are described in the above copending application, incorporated herein by reference, are esters of monofunctional $C_{2-12}$ alcohols and saturated aliphatic $C_{12-16}$ monocarboxylic acids.

The following rheologic data apply to the rheology of preferred invert drilling muds according to the invention: plastic viscosity (PV) in the range of from 10 to 60 mPa.s and preferably in the range of from 15 to 40 mPa.s, yield point (YP) in the range of from 5 to 40 lb/100 $ft^2$ and preferably in the range of from 10 to 25 lb/100 $ft^2$, as measured at 50° C. Full information on the determination of these parameters, on the measurement techniques used and on the otherwise standard composition of the invert oil muds described herein can be found in the prior art cited above and, for example, in "Manual of Drilling Fluids Technology" published by BAROID DRILLING FLUIDS, INC., cf. in particular the Chapter entitled "Mud Testing—Tools and Techniques" and "Oil Mud Technology", which is freely available to interested experts. In the interests of fullness of disclosure, the following summary observations may be made:

Emulsifiers suitable for use in practice are systems which are capable of forming the required w/o emulsions. Selected olephilic fatty acid salts, for example those based on amidoamine compounds, are particularly suitable, examples being described in the already cited U.S. Pat. No. 4,374,737 and the literature cited therein. One particularly suitable type of emulsifier is the product marketed under the name of "EZ-MUL™" by BAROID DRILLING FLUIDS, INC.

Emulsifiers of the above type are marketed in the form of concentrate and can be used, for example, in quantities of from 2.5 to 5% by weight and more especially in quantities of from 3 to 4% by weight, based in each case of the ester oil phase.

In practice, organophilic lignite is used as a fluid-loss additive and forms an impervious coating in the form of a substantially water-impermeable film over the walls of the well. Suitable quantities are, for example, in the range of from 15 to 20 lb/bbl or in the range of from 5 to 7% by weight, based on the ester oil phase.

In drilling muds of the present type, the thickener normally used to create viscosity is a cationically modified, finely divided organophilic bentonite which can be used in quantities of from 8 to 10 lb/bbl or in the range of from 2 to 4% by weight, based on the ester oil phase. The weighing agent normally used in practice to establish the necessary pressure equalization is barite which is added in quantities adapted to the particular conditions to be expected in the well. For example, it is possible by addition of barite to increase the specific gravity of the drilling mud to values of up to about 2.5 and preferably in the range from 1.3 to 1.6.

In invert drilling muds of the present type, the disperse aqueous phase is charged with soluble salts, generally calcium chloride and/or potassium chloride, the aqueous phase preferably being saturated with the soluble salt at room temperature.

The emulsifiers or emulsifier systems mentioned above can also be used to improve the oil wettability of the inorganic weighting materials. In addition to the aminoamides already discussed, alkyl benzensulfonates and imidazoline components are further examples. Additional information on the relevant prior art can be found in the following literature references: GB 2,158,437, EP 229 912 and DE 32 47 123.

One important application for the new drilling fluids is in offshore drilling for the development of oil and/or gas sources, to provide technically useful drilling fluids of high ecological compatibility. The use of the new drilling fluids is of particular importance in, but is not limited to, the offshore sector. The new drilling fluids can also be used quite generally for land-supported drilling, including for example geothermal drilling, water drilling, geoscientific drilling and mine drilling. In this case, too, the ester-based drilling fluids selected in accordance with the invention basically simplify ecotoxic problems to a considerable extent. In addition, the drilling fluids based in accordance with the invention on the co-use of ester oils of the described type are also distinguished by distinctly improved lubricity. This is particularly important when the path of the drill pipe and hence the well deviate from the vertical during drilling, for example at considerable depths. In such cases, the rotating drill pipe readily comes into contact with the well wall and embeds itself therein. Ester oils of the type used as oil phase in accordance with the invention have a distinctly better lubricating effect than the mineral oils hitherto used, which is an important advantage of the present invention.

The invention will be illustrated but not limited by the following examples.

EXAMPLES

EXAMPLE 1

An invert drilling mud was prepared using an undistilled isobutyl rapeseed oil ester at the continuous oil phase. This rapeseed ester was based on a mixture of predominantly unsaturated, straight-chain carboxylic acids which correspond substantially to the following distribution; 60% oleic acid, 20% linoleic acid, 9 to 10% linolenic acid, olefinically unsaturated $C_{20-22}$ monocarboxylic acids approximately 4% remainder saturated monocarboxylic acids predominantly in the $C_{16-18}$ range.

The rapeseed oil ester used had the following characteristic data: density (20° C.) 0.872 g/cm$^3$; pour point below −15° C.; flash point (DIN 51584) above 180° C.; acid value (DGF-C-V 2) 1.2; viscosity at 0° C. 32 mPa.s, viscosity at 5° C. 24 mPa.s; no aromatic compounds.

An invert drilling mud was conventionally prepared using the following mixture constituents:

| | |
|---|---|
| 230 | ml rapeseed oil fatty acid ester |
| 26 | ml water |
| 6 | g organophilic bentonite (GELTONE ™, a product of BAROID DRILLING FLUIDS, INC. of Aberdeen, Scotland) |
| 0.2 | g lime |
| 6 | g water in oil emulsifier ("EZ-MUL ™", a product of BAROID DRILLING FLUIDS, INC.) |
| 340 | g basis |
| 9.2 | g $CaCl_2 \times 2H_2O$ |
| 20 | g organophilic lignite ("DURATONE ™", a product of BARIOD DRILLING FLUIDS. INC.) |

Plastic viscosity (PV), yield point (YP) and gel strength after 10 seconds and 10 minutes were first determined on the material before ageing by viscosity measurement at 50° C.

The invert drilling mud was then aged for 16 h at 125° C. in an autoclave in a so-called "roller oven" to determine the effect of temperature on the stability of the emulsion. The viscosity values were redetermined at 50° C.

The following results were obtained:

| | Unaged material | Aged material |
|---|---|---|
| Plastic viscosity (PV) | 35 | 62 |
| Yield point (YP) | 21 | 24 |

-continued

| | Unaged material | Aged material |
|---|---|---|
| Gel strength (lb/100 ft$^2$) | | |
| 10 seconds | 12 | 12 |
| 10 minutes | 14 | 15 |

COMPARISON EXAMPLE 1

Another invert drilling mud was prepared in the same way as in Example 1, except that on this occasion the quantity of lime was increased to 4 g, i.e. drastically beyond the limit of approximately 2 lb/bbl.

Once again, the viscosity values and gel strength of the material were determined before and after ageing. The following results were obtained:

| | Unaged material | Aged material |
|---|---|---|
| Plastic viscosity (PV) | 41 | cannot be measured |
| Yield point (YP) | 22 | cannot be measured |
| Gel strength (lb/100 ft$^2$) | | |
| 10 seconds | 11 | 74 |
| 10 minutes | 17 | 72 |

EXAMPLE 2

Another invert drilling mud was prepared with a continuous oil phase. The oil phase consisted of distilled oleic acid isobutyl ester which has the following characteristic data: density (20° C.) 0.86 gg/cm$^3$; viscosity (20° C.) 8 to 10 mPa.s; pour point below −25° C.; flash point (51584) above 185° C.; acid value (DGF)-CV 2) below 1; no aromatic compounds.

A drilling mud of the following composition was prepared:

| | |
|---|---|
| 210 | ml isobutyl oleate |
| 6 | g fatty-acid-based emulsifier (INVERMUL ™, a product of BAROID DRILLING FLUIDS, INC.) |
| 6 | g organophilic bentonite (GELTONE II ™, a product of BAROID DRILLING FLUIDS, INC.) |
| 13 | g organophilic lignite (DURATONE ™, a product of BAROID DRILLING FLUIDS, INC.) |
| 1 | g lime |
| 3 | g water in oil emulsifier (EZ-MUL ™, a product of BAROID DRILLING FLUIDS, INC.) |
| 270 | g barite |
| 58.2 | g saturated aqueous $CaCl_2$ solution |

Plastic viscosity, yield point and gel strength after 10 seconds and 10 minutes were determined before and after ageing (16 h at 125° C. in a roller oven) in the same way as in Example 1. The results obtained are shown below. In the formulation used here, [1.2 kg] *1.9 g* lime substantially corresponds to the limit of 2 lb/bbl.

| | Unaged material | Aged material |
|---|---|---|
| Plastic viscosity (PV) | 46 | 41 |
| Yield point (YP) | 35 | 32 |
| Gel strength (lb/100 ft$^2$) | | |
| 10 seconds | 17 | 18 |
| 10 minutes | 21 | 29 |

[COMPARISON] EXAMPLE [2] *3*

Another invert drilling oil emulsion was prepared using the formulation of Example 2, except that the addition of lime was increased to 2 g and hence to [clearly beyond] *within* the limit of *about* 2 lb/bbl. The plastic viscosity, yield point and gel strength of the material before and after ageing are shown in the following:

| | Unaged material | Aged material |
|---|---|---|
| Plastic viscosity (PV) | 33 | 46 |
| Yield point (YP) | 61 | 45 |
| Gel strength (lb/100 ft$^2$) | | |
| 10 seconds | 33 | 24 |
| 10 minutes | 40 | 29 |

We claim:

1. An invert emulsion drilling mud free of mineral oil and substantially free from highly hydrophilic basic materials selected from the group consisting of alkali metal hydroxides and amines selected from diethanolamine and triethanolamine, consisting essentially of A. a continuous oil phase composed predominantly of at least one monocarboxylic acid ester of a $C_2$–$C_{12}$ monofunctional alcohol wherein the monocarboxylic acid contains from 16 to 24 carbon atoms and is olefinically mono- or poly-unsaturated, B. a disperse aqueous phase, C. at least one emulsifier, D. at least one weighting agent, E. a viscosifier, F. at least one fluid loss additive, and G. a mildly alkaline alkali reserve component consisting essentially of lime in a quantity not exceeding about 2 lb/bbl of said drilling mud.

2. The invert emulsion mud of claim 1 wherein the disperse aqueous phase B contains at least one of $CaCl_2$ or KCl as a dissolved salt.

3. The invert emulsion mud of claim 1 wherein from about 5 to about 45% by weight of component B is present therein.

4. The invert emulsion mud of claim 3 wherein from about 10 to about 25% by weight of component B is present therein.

5. The invert emulsion mud of claim 1 wherein component A has a Brookfield (RVT) viscosity at 0° to 5° C. of below 50 mPa.s.

6. The invert emulsion mud of claim 1 wherein the invert emulsion mud has a plastic viscosity (PV) in the range of from about 10 to about 60 mPa.s and a yield point (YP) in the range of from about 5 to about 40 lb/100 ft$^2$, as measured at 50° C.

7. The invert emulsion mud of claim 1 wherein component A also contains esters of saturated monocarboxylic acids.

8. The invert emulsion mud of claim 1 wherein in component A the oil phase contains at least about 70% by weight of the at least one monocarboxylic acid ester.

9. The invert emulsion mud of claim 8 wherein about 80% by weight of the at least one monocarboxylic acid ester is present.

10. The invert emulsion mud of claim 8 wherein about 90% by weight of the at least one monocarboxylic acid ester is present.

11. The invert emulsion mud of claim 1 wherein the at least one monocarboxylic acid ester of component A has a pour point and setting point below about −10° C., and a flash point above about 100° C.

12. The invert emulsion mud of claim 11 wherein the pour point and setting point is below about −15° C., and the flash point is above about 160° C.

13. The invert emulsion mud of claim 1 wherein in component A the acid moiety of the at least one monocarboxylic acid ester contains at least about 60% by weight of monoolefinically unsaturated acids and no more than about 35% by weight di- and polyolefinically unsaturated acids.

14. The invert emulsion mud of claim 1 wherein in component A the acid moiety of the at least one monocarboxylic acid ester contains more than about 45% by weight of either diolefinically unsaturated acids, polyolefinically unsaturated acids, or a mixture of di- and poly-olefinically unsaturated acids.

15. The invert emulsion mud or claim 14 wherein said percentage is more than about 55%.

16. The invert emulsion mud of claim 1 wherein in component A the continuous oil phase contains no more than about 20% by weight of esters of saturated $C_{16}$–$C_{18}$ carboxylic acids.

17. The invert emulsion mud of claim 16 wherein said percentage is no more than about 10% by weight.

18. The invert emulsion mud of claim 1 wherein in the at least one monocarboxylic acid ester of component A the monocarboxylic acid is linear.

19. The invert emulsion mud of claim 1 wherein in the at least one monocarboxylic acid ester of component A the alcohol moiety contains from 3 to 10 carbon atoms and is saturated, straight chain or branched.

20. The invert emulsion mud of claim 1 wherein said lime is present in an amount of from 1 to 1.8 lbs/bbl of said drilling mud.

21. The invert emulsion mud of claim 1 wherein said alkali reserve component includes a weakly basic metal oxide, zinc oxide, or zinc compound.

[22. The invert emulsion mud of claim 1 wherein in component A the acid moiety of the at least one monocarboxylic acid ester contains more than about 45% by weight of either diolefinically unsaturated acids, polyolefinically unsaturated acids, or a mixture of di- and poly- olefinically unsaturated acids.]

23. [A drilling fluid] *An invert drilling fluid that is* free of mineral oil [for use in an invert drilling mud that] *and* is substantially free from highly hydrophilic basic materials selected from the group consisting of alkali metal hydroxides and amines selected from diethanolamine and triethanolamine, *said fluid* consisting of A. a continuous oil phase composed of at least one monocarboxylic acid ester of a $C_2$–$C_{12}$ monofunctional alkanol wherein the monocarboxylic acid contains from 16 to 24 carbon atoms and comprises at least about 60% by weight of monoolefinically unsaturated acids and no more than about 35% by weight of di- and poly- olefinically unsaturated acids, [and]

B. a disperse aqueous phase[.], *and*

*C. a mildly alkaline alkali reserve component consisting essentially of lime in a quantity not exceeding above about 2 lb/bbl of said drilling fluid.*

24. The drilling fluid of claim 23 wherein in component A has a Brooksfield (RVT) viscosity at 0° to 5° C. of below 50 mPa.s.

25. The drilling fluid of claim 23 wherein in component A the oil phase contains at least about 70% by weight of the at least one monocarboxylic acid ester.

26. The drilling fluid of claim 23 wherein the at least one monocarboxylic acid ester of component A has a pour point and setting point below about −10° C., and a flash point above about 100° C.

27. The drilling fluid of claim 23 wherein in the at least one monocarboxylic acid ester of component A the monocarboxylic acid is linear.

28. The drilling fluid of claim 23 wherein in the at least one monocarboxylic acid ester of component A the alcohol moiety contains from 1 to 10 carbon atoms and is saturated, straight chain or branched.

29. An invert emulsion drilling mud free of mineral oil and substantially free from highly hydrophilic basic materials selected from the group consisting of alkali metal hydroxides and amines selected from diethanolamine and triethanolamine, consisting essentially of A. a continuous oil phase composed predominantly of at least one monocarboxylic acid ester of a $C_2$–$C_{12}$ monofunctional alcohol wherein the monocarboxylic acid contains from 16 to 24 carbon atoms and comprises at least about 60% by weight of monoolefinically unsaturated acids and no more than about 35% by weight of di- and poly- olefinically unsaturated acids, B. a disperse aqueous phase, C. at least one emulsifier, D. at least one weighting agent, E. a viscosifier, F. at least one fluid loss additive, and G. a mildly alkaline alkali reserve component consisting essentially of lime in a quantity not exceeding about 2 lb/bbl of said drilling mud.

30. The invert emulsion mud of claim 29 wherein from about 5 to about 45% by weight of component B is present therein.

31. The invert emulsion mud of claim 30 wherein from about 10 to about 25% by weight of component B is present therein.

32. The invert emulsion mud of claim 29 wherein component A has a Brookfield (RVT) viscosity at 0° to 5° C. of below 50 mPa.s.

33. The invert emulsion mud of claim 29 wherein the invert emulsion mud has a plastic viscosity (PV) in the range of from about 10 to about 60 mPa.s and a yield point (YP) in the range of from about 5 to about 40 lb/100 $ft^2$, as measured at 50° C.

34. The invert emulsion mud of claim 29 wherein in component A the oil phase contains at least about 70% by weight of the at least one monocarboxylic acid ester.

35. The invert emulsion mud of claim 29 wherein the at least one monocarboxylic acid ester of component A has a pour point and setting point below about −10° C., and a flash point above about 100° C.

36. In the development of a source of oil or gas by drilling using a drilling mud, the improvement comprising pumping the invert emulsion mud of claim 2 into said source.

37. In the development of a source of oil or gas by drilling using a drilling mud, the improvement comprising pumping the invert emulsion mud of claim 6 into said source.

38. In the development of a source of oil or gas by drilling using a drilling mud, the improvement comprising pumping the invert emulsion mud of claim 11 into said source.

39. In the development of a source of oil or gas by drilling using a drilling mud, the improvement comprising pumping the invert emulsion mud of claim 13 into said source.

40. In the development of a source of oil or gas by drilling using a drilling mud, the improvement comprising pumping the invert emulsion mud of claim 1 into said source.

41. In the development of a source of oil or gas by drilling using a drilling mud, the improvement comprising pumping the invert emulsion mud of claim 29 into said source.

*42. The invert emulsion mud of claim 19 wherein the alcohol moiety is branched and the monocarboxylic acid is predominantly oleic acid.*

*43. The invert emulsion mud of claim 42 wherein the monocarboxylic acid is derived from rape seed oil.*

* * * * *